July 13, 1926.
P. P. FRAZER
MOLD ASSEMBLING DEVICE
Filed Oct. 26, 1922  2 Sheets-Sheet 2
1,592,483
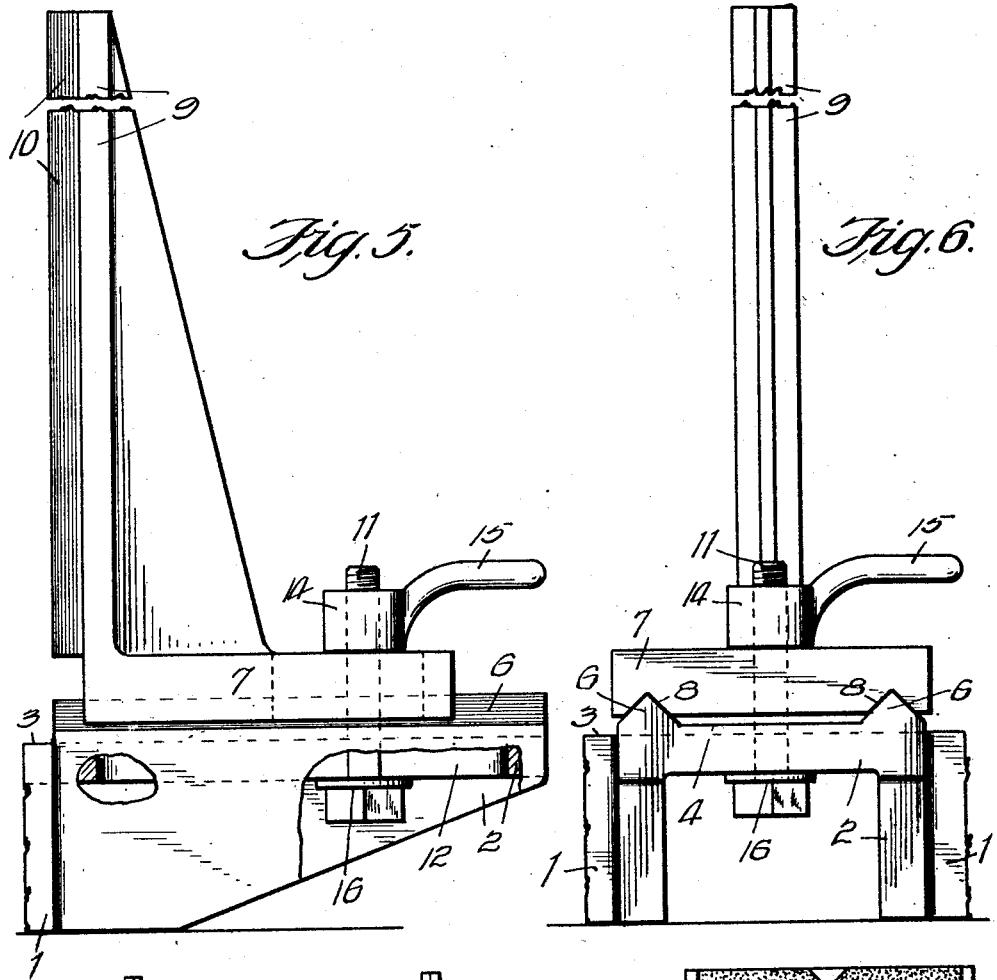
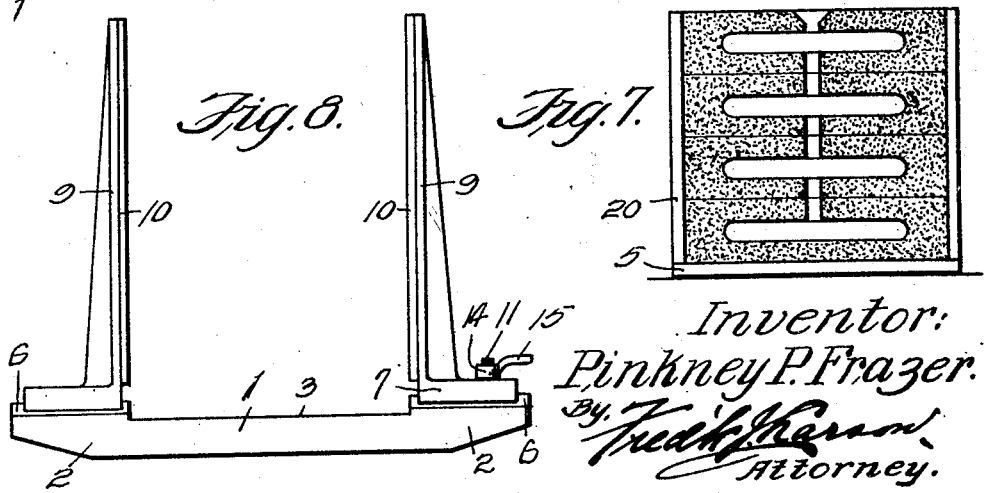
Inventor:
Pinkney P. Frazer.
By Fred'k Hanson
Attorney.

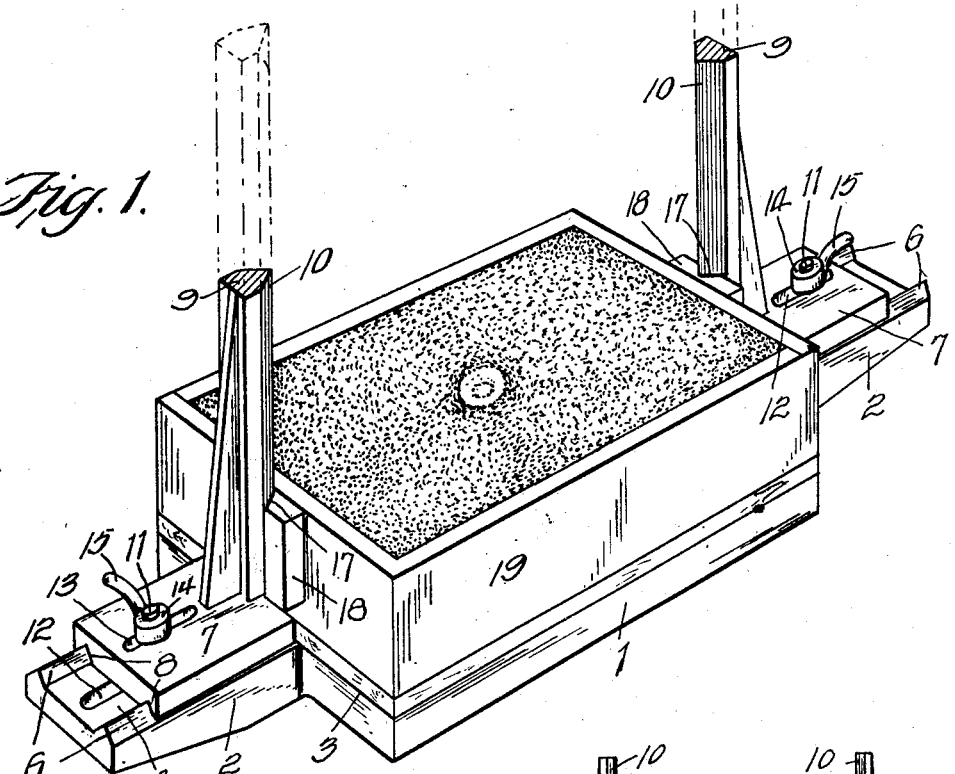

Patented July 13, 1926.

1,592,483

UNITED STATES PATENT OFFICE.

PINKNEY P. FRAZER, OF ST. LOUIS, MISSOURI, ASSIGNOR TO EDWARD SCHAEFER AND DETLEF F. SCHAEFER, TRUSTEES FOR THE MULTIPLE MOLDING MACHINE CO., OF ST. LOUIS, MISSOURI, A COMMON-LAW TRUST.

MOLD-ASSEMBLING DEVICE.

Application filed October 26, 1922. Serial No. 597,085

This invention relates to a sand mold assembling device and is more particularly adapted for use in assembling sand molds for multiple molding, although not necessarily limited thereto, as the device can be successfully employed in cope and drag work.

The object of the present invention is to provide guiding means for guiding a flask and the sand mold therein when assembling or mounting one mold upon another to insure true register, or matching of the mold cavities, which is very essential, especially in multiple molding.

A further object of the invention is to provide a mold assembler having a stationary base and guide standards which are horizontally movable away or toward each other to accommodate themselves to the lengths of different size flasks.

A further object of the invention is to provide means for securely locking the guide arms, or standards to the base at any desired distance apart for receiving a flask therebetween without longitudinal or transverse play thereof.

A still further object of the invention is the provision of a device which consists of a minimum number of parts, easily and quickly adjusted, strong and durable so as to prevent any possible chance of molds being assembled so that the mold cavities thereof will be out of register or match, and which will prove highly efficient for the purpose intended.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views;

Fig. 1, is a perspective view of a mold assembling device embodying my invention and showing a flask and mold supported thereby.

Fig. 2, is a sectional view showing a plurality of flasks and molds stacked one upon the other between the guide arms of the device.

Fig. 3, is a plan view of the base member.

Fig. 4, is a side elevation thereof.

Fig. 5, is a detail in side elevation of one end of the device.

Fig. 6, is an end elevation of the device.

Fig. 7, is a detail in sectional elevation of a plurality of molds after the flasks have been removed and the stripper box applied.

Fig. 8, is a modified form of the device wherein one of the guide arms is stationary with the base.

In carrying out the aim of the present invention, I employ a suitable base plate 1 having a comparatively narrow extension plate 2 extending from each end of the plate longitudinally thereof. The upper surface 4 of each end extension plate 2 is slightly elevated from the upper surface 3 of the main base or mold supporting plate 1 so as to permit of a pallet plate 5 to be laid upon the base plate 1 upon which the molds are supported so that assembled molds may be removed from the assembling device upon the pallet after a stripper box has been positioned about the molds to hold them in their assembled position.

A pair of inverted V-shaped rails 6 are formed upon the upper face 3 of the base extensions 2 which extend the full length thereof. A slidable plate 7 having the rail engaging ways 8 in its lower face is mounted upon the rails 6 of each extension plate 2 so as to permit of longitudinal movement of the plate 7 but preventing lateral displacement thereof. Each slidable plate 7 is provided with an upwardly directed guide standard or arm 9 having its inner face provided with a machined V-shaped guide edge 10. The slidable plates 7, or the feet of the guide standards 9, as they may be called, are held in locked relation with the rails 6 of the extension plates 2 by means of the bolts 11 which pass upwardly through a slotted opening 12 of each extension plate 2 and a registering slotted opening 13 in each slidable guide supporting plate 7. Each locking bolt 11 is provided at its upper threaded end with a suitable nut 14 having a handle 15 extending therefrom so that the nut may be easily turned. The lower ends of the bolts 11 are each provided with a suitable head 16 to engage the lower face of the extension plates 2.

As clearly shown in Fig. 1, of the drawings, the guide arms or standards are adjusted to snugly engage the V-shaped grooves 17 of the plates 18 which are fixed to the end walls of a molder's flask 19 when the flask is mounted upon the base plate 1 of the assembling device.

After a mold has been formed within the flask 19 in the usual way, the flask is mounted upon the pallet plate of the assembling device. A second flask is mounted upon the first flask, a third flask upon the second flask, and so on until the desired number of flasks and molds have been mounted upon one another between the guide arms. When the desired number of flasks and molds have been positioned in this manner, which insures alignment, register or match of the mold cavities, the nuts 14 are loosened permitting the guide arms to be disengaged from the V-shaped grooves of the flask plates. After the guide arms have been moved away, the flasks 19 are removed from the molds in the usual manner.

After the flasks 19 have been removed from their respective molds, a suitable stripper box 20, as shown in Fig. 7 is formed over and around the molds in the usual manner for holding the molds from displacement during removal from the assembling device and during the pouring process.

From the foregoing description, it is evident that I provide a simple and practical device for the true assembling of molds one upon the other so that the mold cavities will positively align which is very essential, especially in the art of multiple molding. While I emphasize multiple molding, it is evident that the device can be used equally as well for ordinary cope and drag work, thus insuring a perfectly true match of the mold cavities before the stripper box is applied to the mold sections.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claims when fairly construed.

What I claim is:

1. In combination with a molder's flask and mold therein, having a groove carried by opposed walls of the flask, of a base plate adapted to support a pallet plate and flask guiding arms supported in opposed relation upon said base plate for engagement in the grooves of a plurality of flasks mounted upon one another between the guiding arms to insure true register of the mold cavities therein for multiple molding.

2. In combination with a molder's flask and mold therein, having a groove carried by opposed walls of the flask, of a base plate adapted to support a pallet plate, flask guiding arms supported in opposed relation upon said base plate for engagement in the grooves of a plurality of flasks mounted upon one another between the guiding arms to insure true register of the mold cavities in multiple molding, means for permitting adjustment of the guiding arms toward or away from each other to accommodate flasks of equal lengths therebetween to be guided thereby, and means for locking the guide arms against movement after adjustment to engage and guide a plurality of flasks of a predetermined length in stacked relation for multiple molding.

3. In a mold assembling device for multiple molding, a base plate adapted to support a pallet plate, end extension plates directed in opposite directions and having their upper faces elevated above the upper face of the base plate, an L-shaped guide member slidably supported upon each extension plate, a V-shaped vertically disposed guide edge for each guide member adapted for engagement with guide grooves of a plurality of molder's flasks to insure true register of mold cavities when flasks and molds are stacked one upon the other for multiple molding, and means for locking the guide members to the end extensions of the base plate in their adjusted relation to one another for retaining the stacked flasks and molds therein against displacement while pouring the molds.

In testimony whereof, I have hereunto signed my name to the specification.

PINKNEY P. FRAZER.